March 14, 1967 J. M. KELLEY ETAL 3,309,350
PROCESS FOR POLYMERIZING ETHYLENE
Filed July 31, 1963
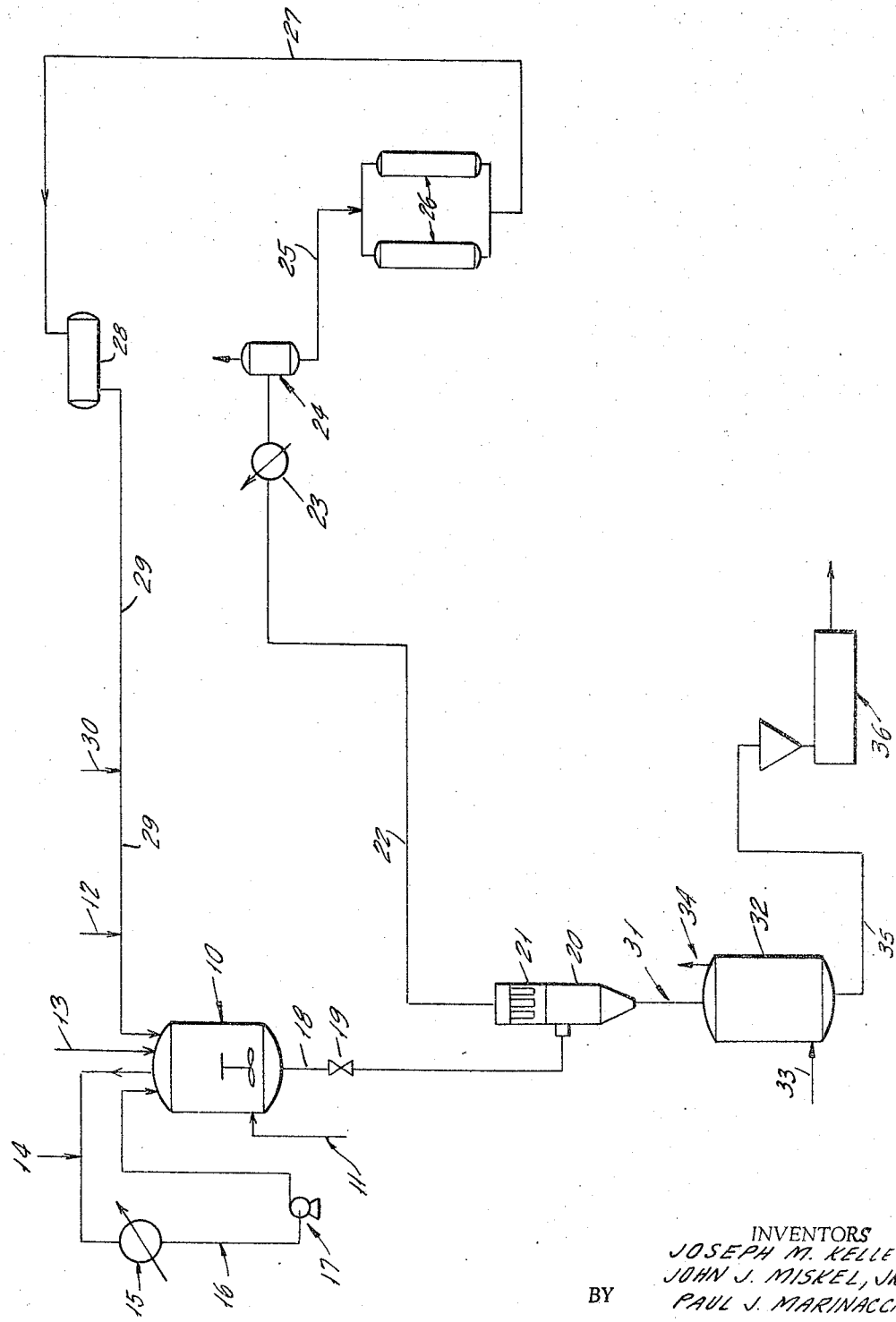
INVENTORS
JOSEPH M. KELLEY
JOHN J. MISKEL, JR.
PAUL J. MARINACCIO
BY
Fred B. Valles

3,309,350
PROCESS FOR POLYMERIZING ETHYLENE
Joseph M. Kelley, Westfield, John J. Miskel, Jr., Ramsey, and Paul J. Marinaccio, Dumont, N.J., assignors to Rexall Drug and Chemical Company, Los Angeles, Calif., a corporation of Delaware
Filed July 31, 1963, Ser. No. 299,028
7 Claims. (Cl. 260—94.9)

This invention relates to a process for polymerizing ethylene to high molecular weight linear polymers of controlled melt viscosity and high densities and it relates in particular to a high catalyst efficiency process wherein extremely high quantities of polymer are prepared per pound of catalyst used—so high in fact are the quantities of polymer produced per pound of catalyst used, that where specific conditions of this process are employed, the polymer can be recovered directly from a slurry and the costly step of deashing (catalyst residue removal) eliminated entirely.

One of the disadvantages of prior art polyethylene manufacturing processes with titanium tetrachloride and aluminum trialkyl at pressures ordinarily below 500 p.s.i.g., has been the fact that the ultimate polymer recovered from a slurry or solution is contaminated with catalytic residues such as titanium, aluminum and chlorine. Titanium is particularly bad as a polymer contaminant since amounts anywhere above 50 to 60 parts per million based on the polymer (and in some cases above 20 parts per million), if not deactivated in some manner, usually have to be removed therefrom, otherwise upon processing of the polyethylene, such as in injection molding, the polymer will discolor or streak and as a consequence, will be downgraded.

Although efficient deashing schemes have been developed in the prior art, such deashing schemes usually require a large plant investment, for example, in the order of about 20% and this adds considerably to the cost of manufacturing the polymer.

Athough it has been reported in the art that some catalysts other than those with which this invention is concerned give high catalyst efficiencies in vapor phase reaction, thereby not requiring the removal of ash residues, usually the polymers obtained are of very high molecular weight and extra steps are required to bring the molecular weight of the polymer to a suitable range for commercial plastic processing applications. Such steps may include thermally degrading the polymer or blending of the polymer with lower molecular weight material, in any event, requiring some special aftertreatment, thereby adding to the total cost of manufacture. A process wherein an ethylene polymer can be prepared without removal of catalyst residues and without special aftertreatment to reduce molecular weight has not heretofore been reported in the industry.

In prior art commercial processes for preparing linear polyethylene employing catalysts produced by aluminum alkyl reduction of titanium tetrachloride (the usual brown catalysts) there are consistently obtained linear polyethylenes of densities ranging from about 0.945 to 0.955. Thus, in M. Sittig's book, "Polyolefin Resin Processes," p. 5, 1961, Gulf Publishing Company, Houston, Texas, there is illustrated in graph form densities of various commercial linear polyethylene resins and the processes used in manufacturing them. It is illustrated, for example, that linear polyethylenes prepared by the so-called "Ziegler Process" may range in density from about 0.945 to about 0.955. Polyethylenes prepared by the "Phillips Process" on the other hand, that is, with a chromium oxide containing catalyst composite, range in densities from above, for example, 0.955 to 0.965 or higher. It is evident that it would be both desirable and highly advantageous to consistently produce linear polyethylenes of densities higher than 0.955 by the use of titanium containing catalysts. The process of this invention now provides this desirable feature, so that linear polyethylenes having densities of 0.96 and higher can be produced while employing titanium containing catalysts as will be illustrated hereinbelow.

An object of this invention is to provide a process for preparing an ethylene polymer wherein such high catalyst efficiencies are obtained that the polymer need not be deashed.

A further object of this invention is the provision of a process for preparing an ethylene polymer wherein molecular weight control can be achieved during the polymerization of ethylene.

A still further object of this invention is to provide a process for preparing linear polyethylenes of densities of above 0.955 by the use of a titanium containing catalyst.

A still further object of this invention is the provision of a high catalyst efficiency process for preparing polyethylene possessing certain economic advantages over prior art techniques and resulting in polymers containing substantially no catalyst residues.

Another object of this invention is the preparation of copolymers of ethylene with alpha-olefin monomers in a high catalyst efficiency process.

In accordance with the foregoing, it has been discovered that ethylene can be polymerized or copolymerized in a high catalyst efficiency process by reacting ethylene alone or in the presence of minor amounts of an alpha-olefin monomer in a polymerization reactor at pressures of at least 750 p.s.i.g. and temperatures of from 50 to 100° C. in the presence of an inert hydrocarbon diluent boiling below 10° C. while employing as the catalyst for the polymerization reaction titanium trichloride and as an activator therefor, an aluminum compound containing at least one metal to carbon bond, the ratio of aluminum to titanium employed being at least 2:1, but preferably about 5:1, and more preferably 25:1 to as high as 150:1. By the process of this invention, specifically in the preferred embodiment of this invention, there is obtained ethylene polymers or copolymers having a minimum residual titanium content in the order of 10 to 15, and generally below 60, parts per million, thereby requiring no deashing, and in the case of homopolymers, linear polyethylenes of densities higher than 0.955 and up to 0.97.

The process of this invention also provides in its preferred embodiment, a technique for carrying out the high catalyst efficiency polymerization and this comprises the steps of introducing ethylene and hydrogen to a polymerization reactor containing therein as an inert hydrocarbon diluent, a hydrocarbon having a boiling point of from about −45° to 0° C. employing pressures in said reactor of at least 750 p.s.i.g. and up to 10,000 p.s.i.g. but preferably 1000 to 4500 p.s.i.g. at temperatures of from about 50° to 100° C. In the preferred embodiment hereof, the ethylene, after a conversion of from 50 to 95 percent in said reactor, which conversion is carried out in the presence of titanium trichloride activated with an aluminum trialkyl, the aluminum to titanium mole ratio being about 25:1, is withdrawn from the reactor to a lower pressure zone in the form of a slurry of ethylene polymer, unreacted ethylene and hydrocarbon diluent and continuously flashed from said slurry. The flashed ethylene and inert hydrocarbon diluent is recycled directly to the polymerization reactor, or where preferred, a simple clean-up treatment is provided for this recycle stream. The ethylene polymer substantially completely dry from the low pressure zone, can be led either directly to an extruder or it can be steam stripped and then extruded and pelletized. In the preferred process as set forth, from 10 to 80 mole percent hydrogen based on the ethylene can also be introduced into the reactor to control molecular weight of the polymer.

It was unexpected to find that ethylene could be polymerized at such high catalyst efficiencies with a titanium trichloride catalyst component, specifically where hydrogen is included as a molecular weight control agent. It was further unexpected to find that homopolymers of ethylene were consistently produced with densities of 0.96 and greater. The process of this invention is not only applicable to homo-polymerization of ethylene in hydrocarbon diluents such as ethane, propane, butane, isobutane or neopentane, but preferably propane or butane, but also to copolymerization of ethylene with other alpha-monomers by the employment of pressures above 750 p.s.i.g. It was found that if pressures below 750 p.s.i.g. are employed, while good polymerization rates are obtained, the residual ash content of the polymer remained high. No explanation can be offered for the increased catalyst efficiency at pressures higher than 750 p.s.i.g., although, as will be illustrated in the examples, at pressures at low as 800 p.s.i.g., catalyst efficiencies of consistently above 60,000 and usually up to and higher than 100,000 pounds of polymer per pound of catalyst based on titanium have been realized. With these efficiencies, and specifically those approaching 100,000 pounds of polymer per pound of titanium based on the metal, the residual polymer contains on the order of 10 parts per million titanium, thereby requirnig no deashing. It should be pointed out here that for some applications titanium content in parts per million of above 15, for example, up to 60 can be tolerated. Thus, even in some of the best known deashing schemes, it is not unusual to detect titanium contents of this order. The process of this invention obviously possesses superior advantages over those which require such after treatment to remove titanium residues.

It has been known to polymerize ethylene or propylene in normally liquid diluents such as hexane or heptane and to control the molecular weight or viscosity of the polymer by the use of hydrogen. It is also known that the use of hydrogen deactivates to a minor, but important, extent the catalyst used in the polymerization of either ethylene or propylene. This is particularly true where titanium trichloride catalysts are employed in propylene polymer processes. For example, in British Patent 908,101, it was disclosed that hydrogen can be satisfactorily used for control of molecular weight of polypropylene and that certain low melt viscosities can be obtained. It was also disclosed in this patent, however, that in order to obtain polypropylenes of lower melt viscosity, more hydrogen must be used than when the higher melt viscosity polypropylenes are prepared, but the rate of the polymerization reaction and the yield of polypropylene produced were reduced when using these higher quantities of hydrogen. This observation has been found to be true especially where hydrogen was used as a molecular weight control agent in ethylene polymerizations at pressures below 750 p.s.i.g.

While the deactivating effect of hydrogen continues even with pressures above 750 p.s.i.g., it was found that upon elevating the polymerization pressure of the reaction system to preferably from 1000 to 3500 p.s.i.g., that 10 to 50 percent hydrogen based on the ethylene feed did not reduce the catalyst efficiency sufficiently to require deashing of the polymer.

The process of this invention is applicable to the polymerization of ethylene with minor amounts of comonomers such as propylene, butene-1, pentene-1, hexene-1, octene-1, etc., as well as branched alpha-monomers such as 4-methyl-pentene-1, 4,4-dimethyl-pentene-1, 3-methyl-butene-1, 3,3-dimethyl-butene-1 and the like. The amounts of alpha-olefin monomer fed with ethylene can range from 1 to 20 mole percent based on the ethylene feed.

One of the unexpected and added advantages of employing, particularly butene-1 as a copolymerizable monomer in the process of this invention was the finding that when butene-1 is used to contact the catalyst prior to the polymerization that a pronounced effect on the polymerization rate is obtained. For example, by treating the mixed catalyst with butene-1 for a certain period of time and temperature, the rate of polymerization of ethylene is substantially doubled. This treatment can be carried out with the mixed catalyst, for example, by adding an amount of from about 0.2 to 3 grams of butene-1 per miligram of $TiCl_3$ catalyst. The treatment can be carried out in the inert diluent merely by adding the butene-1 to the mixture and heating at 25° to 75° C. for about 1 to 30 minutes, but preferably at a temperature of from 50° to 65° C.

In accordance with the foregoing, a broad pressure range for carrying out the polymerization reactions of this invention is from at least 750 p.s.i.g. and as high as 10,000 p.s.i.g., but preferably from 1000 to 5000 p.s.i.g. and more preferably from 2000 to 4500 p.s.i.g.

A preferred catalyst for carrying out the process of this invention is titanium trichloride, specifically the violet form and more specifically a titanium trichloride cocrystallized with a Group II metal halide, for example, magnesium, zinc or aluminum trichloride, with aluminum trichloride being preferred. In the preferred form for this catalyst compound, $nTiCl_3 \cdot AlCl_3$, the letter $n$ represents a digit that can vary from 1 to 5. In a specific embodiment of this invention the cocrystallized titanium trichloride·aluminum chloride is subjected to attrition such as ball milling in an inert or dry atmosphere, activated with aluminum triethyl and employed as the catalyst in the process herein to obtain very high polymerization rates. Although aluminum triethyl has been specified as a particular catalyst component preferred, aluminum trialkyls or dialkyl aluminum mono halides can likewise be employed. The alkyl groups can contain from 1 to 10 carbon atoms, more specifically from 2 to 8 carbon atoms and the preferred halide is chlorine.

The amount of total catalyst preferred per part by weight of ethylene introduced into a reaction ranges from 0.0001 to 0. 001.

It is preferred, according to this invention to employ an aluminum to titanium ratio of at least 2:1, more preferably 25:1 to as high as 150:1 for example. In processes of this nature, it is not required that both catalyst components be added simultaneously in the ratio stated, since it has been found particularly advantageous to treat the inert diluent with aluminum trialkyl to deactivate any catalytic poisons therein and thereafter to add the requisite amount of $TiCl_3$ and/or aluminum triethyl to bring the catalyst ratios to those preferred.

Usually the preferred inert diluents herein, such as propane or butane, contain small amounts of poisons such as water and these poisons must be removed or deactivated prior to use of these diluents as polymerization media, otherwise, because of the small quantity of catalyst required in the polymerization, such poisons tend to destroy at least part of the catalyst activity. It is, therefore, preferred to treat the butane diluent, for example, with 0.001 to 0.003 part aluminum trialkyl per part by weight of butane diluent. Since sufficient aluminum alkyl remains in the diluent, it is therefore only required to add sufficient titanium trichloride alone or in combination with aluminum trialkyl to bring the combined catalyst to the desired Al/Ti ratio. The preferred diluents as indicated herein are propane and butane.

The most efficacious temperatures to be used in this process are temperatures of from 50° to 100° C. with best results being obtained at temperatures of 65° to 80° C.

As indicated hereinabove, hydrogen can be used as the molecular weight control agent in amounts of from 10 to 80% based on the ethylene feed, but preferably where an alpha-comonomer is employed, a combination 5 to 25 percent hydrogen and 1 to 20 percent comonomer.

To obtain high catalyst efficiencies in the process of this invention, it is required that the residence time in either a batch or a continuous process for ethylene polymerization average from about 1 to 5 hours in a reactor. Where such residence times are employed, polyethylene is produced containing less than 15 parts per million of titanium and sufficiently low aluminum and chlorine content so that deashing is not required.

The process of this invention in its preferred embodiment is depicted in the attached drawing which forms part of this invention and illustrates a process flow diagram for carrying out the polymerization reaction.

In the drawing, reactor 10 is a pressure resistant vessel capable of withstanding pressures up to 10,000 p.s.i.g. or higher. Ethylene is introduced to the reactor through line 11, aluminum trialkyl through line 12, titanium trichloride through line 13 and recycled inert diluent through line 29. Due to the nature of the inert diluent used, the exothermic reaction causes the boiling of the diluent and through evaporative cooling, a certain amount of heat can be removed from the reactor. Diluent vapors, as well as unreacted ethylene (and alpha-comonomers) and/or hydrogen are removed through line 14, condensed in condenser 15 and recycled through line 16 and pump 17 to reactor 10. Compression equipment (not shown) can be provided for recycling of hydrogen. Modifications of this arrangement can be made if desired.

After a two or three hour residence time in the polymerization reactor and a preferred conversion of from 10 to 40 weight percent solids, an ethylene-inert diluent slurry is let down from line 18 and valve 19 to atmospheric pressures or slightly above in cyclone-bag filters 20 and 21.

The vaporized ethylene, inert diluent and small amounts of hydrogen are taken via line 22, heater 23 and accumulator 24. Suitable compression equipment (not shown) can be associated with this arrangement to condense butane if needed. A certain amount of the reactants are vented from accumulator 24, for example, from 1.0 to 5.0 percent in order to reduce the inerts or impurity level, if any, in the reaction system. The vented gaseous materials can be taken to purification units (not shown) and to recycle. The recycle stream is then taken through line 25 to either of two dessicant adsorbents 26 in series for removal of any impurities picked up upstream of this unit if desired. Suitable desiccant adsorbent materials are molecular sieves, silica, alumina, etc. From the desiccant adsorbents, the recycled stream is taken via line 27 to storage vessel 28 or directly from storage vessel 28 to line 29 to reactor 10. Fresh diluent can be added through line 30.

From cyclone 20, which can be suitably arranged with a heat loop (not shown) to maintain desired temperatures, a substantially dry ethylene polymer is recovered and this can be taken directly to a drier and an extruder or it can be steam stripped by removing the polymer from cyclone 20 through line 31 and introducing it to vessel 32. In vessel 32, steam is introduced through line 33 to treat the polymer and is then removed through line 34. The steam stripped polymer can be removed from vessel 32 through line 35 and conveyed to a drier system indicated generally at 36. From 36, the polymer powder can be taken to extruders or other finishing steps not shown. The following is an example of the operation of this process.

*Example 1*

In operation, the process of this invention is carried out in units as shown in the drawing by continuously introducing 45 lbs./hour of ethylene (to form 125 lbs. of polyethylene in the reactor) to reactor 10 containing 250 lbs. of butane liquid, adding 15 to 30 mole percent hydrogen and further adding to said mixture catalyst in an amount of 0.005 lb. for the titanium trichloride and a sufficient quantity of aluminum trialkyl to the butane diluent to obtain an Al/Ti ratio of 50 to 1. The polymerization is carried out continuously until a conversion of ethylene of from 50 to 95 percent requiring a residence time of about 3 hours and 385 lbs. of slurry are withdrawn through line 18 comprised of 125 lbs. of polymer, 250 lbs. of butane and 10 lbs. of ethylene. A slight amount of hydrogen is also included in this slurry. Through operation of the let-down valve 19, intermittently or continuously, the slurry is lowered to atmospheric or below pressure in cyclone-bag filters 20 and 21. One hundred twenty-five lbs. of polyethylene are recovered from the cyclone through line 31 containing about 2.0 percent volatiles. The volatiles flashed from the slurry which amount to 247.5 lbs. of butane and 10 lbs. of unreacted ethylene are recycled to the reactor as illustrated in the drawing.

The conditions in the above example are as follows for the various units in the process:

| Reactor | Pressure, p.s.i.g., 3,000 | Temperature 80° C. |
|---|---|---|
| Cyclone-bag Filter | Pressure, p.s.i.g., 50 | Temperature 40° C. |
| Amount of Polymer | 125 lbs | |
| Catalyst Efficiency | 100,000 lbs./lb. based on Ti metal | |
| Polymer Density [1] | 0.96+g./cc | |
| Ash Residues | Ti 10 p.p.m | |
| Melt Index (range) [2] | 0.2 to 1.0 | |

[1] Density is determined according to ASTM D-1505-60T.
[2] Melt Index in grams/10 minutes is determined according to ASTM D-1238-57T, and can be controlled for example to produce higher values than above by using more hydrogen.

The following definitions are to be noted:

(a) Rate of polymerization w./hr./w.=weight of polymer per hour per weight of catalyst (b) Catalyst efficiency=lbs. of polymer produced per pound of $TiCl_3$ catalyst added (or per pound of Ti metal added).

The above values are calculated by two methods. In the first method, rate or catalyst efficiency is calculated based on the actual lbs. of catalyst added and the lbs. of polymer produced. In the second method, which is a check on the catalyst efficiency calculated by the first method, the undeashed polymer is analyzed for Ti metal and using this value, the catalyst efficiency is back calculated.

In Example 2, Table I and the remaining examples below, a series of runs were made using a one liter autoclave containing 500 cc.'s of liquid butane at the conditions indicated in the table. The ethylene was pressured into the reactor and catalyst components added by syringe (butane was pretreated with aluminum triethyl as indicated heretofore). The remainder of the aluminum triethyl was added along with $TiCl_3$ to bring the mixture to the desired Al/Ti ratio.

*Example 2*

TABLE I

| Run number | 1 | 2 | 3 | 4 |
|---|---|---|---|---|
| Al/Ti Ratio | 140 | 70 | 70 | 35 |
| Pressure, p.s.i.g | 1,000 | 1,000 | 1,000 | 1,000 |
| $H_2$, percent on Ethylene Feed | 0 | | 14.1 | 37.2 |
| Yield, grams | 68 | 79 | 72 | 53 |
| Melt Index, g./10 min | 0 | | 0.16 | 1.7 |
| Density, g./cc | | | 0.9605 | 0.9635 |
| Rate of Polymerization, w./hr./w. on $TiCl_3$ | 27,200 | 95,000 | 14,400 | 5,300 |
| Catalyst Efficiency, w./w. (on Ti Metal Added) | 114,000 | 65,500 | 60,300 | 22,000 |
| Catalyst Efficiency, w./w. (on Ti Measured in polymer) | 101,000 | 62,500 | | 18,300 |
| Final Ti Content of Polymer (by analysis), p.p.m | 10 | 16 | | 55 |

All runs 1 hour, except number 2 which was 10 minutes.

The above data show that at pressures of 1000 p.s.i.g., high molecular weight linear polyethylene can be made at catalyst efficiencies of 100,000 w./w. on Ti metal, giving a residual Ti content of about 10 p.p.m. in the polymer. The use of high amounts of hydrogen as in Run 4 tend to decrease catalyst efficiency, but this could be counteracted where pressures higher than 1000 p.s.i.g. are employed, for example, 2500 to 3000 p.s.i.g., as shown in Example 1.

*Example 3*

In a further run using a small scale reactor (one liter autoclave, as in Example 2) and hydrogen to control molecular weight, a high catalyst efficiency was likewise obtained and a measurable melt index even at a pressure as low as 1000 p.s.i.g. (Table II below).

TABLE II

| Run | Grams $TiCl_3$ | Time, hrs. | $H_2$ (mole percent in feed) | Final Al/Ti Ratio | Yield, grams | Lbs./lb. of Ti | Melt Index | Ti Left in Polymer, p.p.m. |
|---|---|---|---|---|---|---|---|---|
| 5 | .005 | 5 | 11.8 | 70 | 122 | 100,000 | .06 | ≈10 |

*Example 4*

Two runs were carried out at 800 p.s.i.g. as reported in Table III below, one using hydrogen and the other omitting it.

TABLE III

| Run | 6 | 7 |
|---|---|---|
| $TiCl_3$, grams | 0.01 | 0.01 |
| Al/Ti Mole Ratio | 50 | 50 |
| Diluent (butane) cc.s | 500 | 500 |
| Time (min.) | 50 | 158 |
| Temperature, °C | 80 | 80 |
| Pressure, p.s.i.g | 800 | 800 |
| $H_2$ in Feed, mole percent | 0 | 9.2 |
| Yield, grams | 271.4 | 254 |
| Rate of Polymerization, lbs./hr./lb. total catalyst | 380 | 354 |
| Catalyst Efficiency, lb./lb. on $TiCl_3$ | 27,140 | 25,400 |
| Catalyst Efficiency, lb./lb. on Ti metal | 108,000 | 102,000 |
| Melt Index, g./10 min | | 0.064 |
| Density, g./cc | | 0.9640 |
| Intrinsic Viscosity, deciliters/gram | | 3.52 |

Run 7 above shows that at catalyst efficiencies of as high as 102,000 lbs./lb. on Ti metal that densities above 0.96 are obtained by the process herein.

*Example 5*

Table IV below shows copolymer runs employing apparatus as in the above examples in which high catalyst efficiencies were likewise demonstrated.

TABLE IV

| Run | 8 | 9 | 10 | 11 [1] |
|---|---|---|---|---|
| Grams $TiCl_3$ | .01 | .0025 | .005 | .005 |
| Time | 1.7 | 1.0 | 1.0 | 1.0 |
| $H_2$, mole percent in feed | 7.4 | | | |
| Al/Ti ratio | 35 | 140 | 70 | 70 |
| Pressure, p.s.i.g | 1,000 | 1,000 | 1,000 | 1,000 |
| Butene-1, cc.s | 25 | 25 | 25 | 25 |
| Yield, grams | 200 | 64 | 78 | 124 |
| Efficiency lb./lb., on Ti metal | 66,667 | 90,909 | 65,000 | ~100,000 |
| Ti Analysis, p.p.m | 15 | 11 | | <10 |
| Melt Index, g./10 min | .04 | | | |

[1] Pretreatment step as follows.—Butene-1 added to mixed catalyst in butane at 50° C. and heated for 9 minutes at 65° C.

The above runs demonstrate the use of butene-1 in preparation of copolymers and also the effect of a butene-1 catalyst pretreatment (Run 11) on the polymerization reaction. Propylene, pentene-1, 4-methyl pentene-1 and other alpha-olefin-monomers can likewise be copolymerized with ethylene by this process to result in high catalyst efficiencies.

*Example 6*

The effect of pretreating the mixed $TiCl_3$ and aluminum triethyl catalyst with butene-1 prior to polymerization is illustrated in Table V below which includes Run 11 from Table IV. The procedure was to add the mixed catalyst to the reactor followed by adding the butane diluent (liquid) which was thereafter heated to the desired pretreat temperature. The butene-1 was added at 50° C. to the butane and mixed catalyst and the mixture heated to 65° C. for from 1 to 10 minutes.

TABLE V

| Run | 12 | 11 | 13 |
|---|---|---|---|
| Grams $TiCl_3$ | .005 | .005 | .005 |
| Time, hrs | 1.0 | 1.0 | 1.0 |
| Al/Ti mole ratio | 70 | 70 | 70 |
| Pressure, p.s.i.g | 1,000 | 1,000 | 1,000 |
| Butene-1, cc.s | 0 | 25 | 25 |
| Pretreat Time, min | 1.0 | 9.0 | 9.0 |
| Yield, grams | 94 | 124 | 161 |
| Activity, lb./hr./lb.; $TiCl_3$ | 18,800 | 24,800 | 32,200 |
| Efficiency, lb./lb., Ti | 78,000 | >100,000 | >100,000 |

As seen from above in Runs 11 and 13, which contain less than 10 p.p.m. Ti on the final resin, higher catalyst efficiencies were more easily obtained than where no butene-1 pretreatment occurred.

Rheological property measurements of several polymers prepared as above and comparison of these properties with those of commercial linear polyethylene resins indicated that preparation of the polyethylene by the relatively higher pressures as set forth herein did not change molecular weight distribution and that processability thereof is comparable to commercial resins. Thus, evaluation of several resins, including those from Runs 3 and 8, for flow properties in a high shear viscometer demonstrated that these polymers have flow properties which are similar to commercial linear polyethylenes prepared at lower pressures. Essentially, therefore, none of the good properties of these resins is adversely affected by operation at the extremely high productivities illustrated.

Copending application, Serial Number 299,030 filed even date herewith illustrates a process for the preparation of linear polyethylenes of low wax content and of densities above 0.955 at lower pressures than illustrated herein employing inert diluents such as propane and butane.

Modifications can be made to the process herein falling within the scope of the appended claims.

What is claimed is:

1. A high catalyst efficiency process for preparing an ethylene polymer having a density of at least 0.955 which comprises reacting ethylene in a polymerization reactor at pressures of at least 800 p.s.i.g. and temperatures of from 50° to 100° C. in the presence of an inert hydrocarbon diluent boiling below 10° C., in liquid form and hydrogen in amounts of from 10 to 80% based on the ethylene feed employing as the catalyst for the polymerization a crystalline cocrystallized titanium trichloride having the formula $nTiCl_3 \cdot AlCl_3$ where $n$ is a digit of 1 to 5 activated with an aluminum trialkyl, the aluminum to titanium ratio of said catalyst employed being at least 25:1, the ethylene polymer being produced with a catalyst efficiency of at least about 60,000 pounds of polymer per pound of catalyst based on titanium metal.

2. The process of claim 1 wherein the aluminum trialkyl compound is aluminum triethyl and the ethylene polymer produced has a density of at least 0.96.

3. The process of claim 1 wherein butane is employed as the inert hydrocarbon diluent.

4. A process for polymerizing ethylene in a high catalyst efficiency process which consists essentially of the steps of
    (a) introducing ethylene to a polymerization reactor containing therein an inert hydrocarbon diluent boiling below 10° C. at pressures of at least 800 p.s.i.g. and temperatures of from about 50° to 100° C.,
    (b) polymerizing said ethylene in the presence of hydrogen in amounts of from 10 to 80% based on the ethylene feed and in the presence of a crystalline cocrystallized titanium trichloride having the formula $nTiCl_3 \cdot AlCl_3$ where $n$ is a digit of 1 to 5 activated with an aluminum trialkyl compound, the aluminum to titanium ratio employed being at least 25:1 and up to 150:1,
    (c) withdrawing from said reactor a slurry of ethylene polymer, unreacted ethylene and hydrocarbon diluent to a low pressure zone maintained at a pressure of from 0 to 50 p.s.i.g. and
    (d) flashing from said slurry unreacted ethylene and hydrocarbon diluent in said low pressure zone, and
    (e) recycling said unreacted ethylene and hydrocarbon diluent to said reaction zone and recovering ethylene polymer, said ethylene polymer being produced with a catalyst efficiency of at least about 60,000 pounds of polymer per pound of catalyst based on titanium metal.

5. The process of claim 4 wherein butane is employed as the inert hydrocarbon diluent.

6. A high catalyst efficiency process for preparing homopolymers of ethylene having a density of 0.96 and above which consists essentially in reacting ethylene in a polymerization reactor at pressures of 800 to 10,000 p.s.i.g. and temperatures of from 50° to 100° C. in the presence of an inert hydrocarbon diluent in liquid form, said hydrocarbon having a boiling point below 10° C., and hydrogen in amounts of from 10 to 80% based on the ethylene, said reaction being carried out in the presence of a crystalline titanium trichloride cocrystallized with aluminum chloride and aluminum trialkyl compound, the aluminum to titanium ratio being at least 25:1, the ethylene homopolymer being produced with a catalyst efficiency of at least about 60,000 pounds of polymer per pound of catalyst based on titanium metal.

7. The process of claim 6 wherein butane is employed as the inert hydrocarbon diluent.

References Cited by the Examiner

UNITED STATES PATENTS

| | | | |
|---|---|---|---|
| 2,893,984 | 7/1959 | Seelbach | 260—93.7 |
| 2,990,399 | 6/1961 | Peterlein | 260—93.7 |
| 2,996,459 | 8/1961 | Andersen et al. | 260—94.9 |
| 3,032,509 | 5/1962 | Langer et al. | 260—94.9 |
| 3,046,266 | 7/1962 | Benning et al. | 260—94.9 |
| 3,051,690 | 8/1962 | Vandenberg | 260—94.9 |
| 3,126,365 | 3/1964 | Hooker | 260—94.9 |
| 3,225,021 | 12/1965 | Erchak | 260—94.9 |

FOREIGN PATENTS 538,782  12/1955  Belgium.

JOSEPH L. SCHOFER, *Primary Examiner.*

F. L. DENSON, *Assistant Examiner.*